(12) United States Patent
Tsukagoshi et al.

(10) Patent No.: US 7,757,095 B2
(45) Date of Patent: Jul. 13, 2010

(54) PERSONAL IDENTIFICATION METHOD, PERSONAL IDENTIFICATION SYSTEM, AND OPTICAL INFORMATION RECORDING MEDIUM

(75) Inventors: Takuya Tsukagoshi, Sagamihara (JP); Jiro Yoshinari, Tokyo (JP); Hideaki Miura, Tokyo (JP); Tetsuro Mizushima, Moriguchi (JP)

(73) Assignee: TDK Corporation, Tokyo (JP)

( * ) Notice: Subject to any disclaimer, the term of this patent is extended or adjusted under 35 U.S.C. 154(b) by 669 days.

(21) Appl. No.: 10/587,502

(22) PCT Filed: Jan. 6, 2005

(86) PCT No.: PCT/JP2005/000082

§ 371 (c)(1),
(2), (4) Date: Jul. 27, 2006

(87) PCT Pub. No.: WO2005/076201

PCT Pub. Date: Aug. 18, 2005

(65) Prior Publication Data

US 2007/0288757 A1    Dec. 13, 2007

(30) Foreign Application Priority Data

Feb. 3, 2004    (JP)    .............................. 2004-026915

(51) Int. Cl.
G06F 21/00    (2006.01)
(52) U.S. Cl. ......................................... 713/186; 726/26
(58) Field of Classification Search .................. None
See application file for complete search history.

(56) References Cited

U.S. PATENT DOCUMENTS

| 4,340,300 A | * | 7/1982 | Ruell ........................... 356/71 |
| 5,461,421 A | * | 10/1995 | Moon ..................... 375/240.13 |
| 5,712,912 A | * | 1/1998 | Tomko et al. ............... 713/186 |
| 5,740,276 A | * | 4/1998 | Tomko et al. ............... 382/210 |

(Continued)

FOREIGN PATENT DOCUMENTS

JP    A-04-264582    9/1992

(Continued)

OTHER PUBLICATIONS

Ljungblad et al., "New Laser Pattern Generator for DUV Using a Spatial Light Modulator", 2001, Elsevier Science, p. 23-29.*

*Primary Examiner*—Michael Pyzocha
*Assistant Examiner*—Jeffery Williams
(74) *Attorney, Agent, or Firm*—Oliff & Berridge, PLC

(57) ABSTRACT

In a personal identification system 10 for identifying a user on the basis of biometric information, a hologram is formed in a holographic recording portion 13 of an optical information recording medium 12. The hologram is provided by the interference between a reference beam subjected to spatial light modulation by record cryptographic identification information based on the biometric information of the user obtained by a biological information sensor 14 and an object beam. At the time of identification, an information processing device 16 makes validation cryptographic identification information from the biometric information directly obtained from the user, and a spatial light modulator 20 modulates a hologram reproduction reference beam by the validation cryptographic identification information. The right or wrong of a reproduced image is detected, and the leakage of the identification information is prevented.

12 Claims, 5 Drawing Sheets

U.S. PATENT DOCUMENTS

| | | | |
|---|---|---|---|
| 6,175,543 B1 * | 1/2001 | Burr et al. | 369/103 |
| 6,697,316 B2 * | 2/2004 | Burr | 369/103 |
| 7,298,908 B2 * | 11/2007 | Lewis et al. | 382/211 |
| 2002/0114027 A1 * | 8/2002 | Horimai | 359/11 |
| 2003/0210805 A1 * | 11/2003 | Lofgren et al. | 382/100 |
| 2004/0101168 A1 * | 5/2004 | Kostrzewski et al. | 382/115 |
| 2006/0050374 A1 * | 3/2006 | Slinger | 359/385 |

FOREIGN PATENT DOCUMENTS

| | | |
|---|---|---|
| JP | A-04-340689 | 11/1992 |
| JP | A-11-102425 | 4/1999 |
| JP | A-2001-067399 | 3/2001 |
| JP | A-2003-178461 | 6/2003 |
| JP | A-2003-256746 | 9/2003 |
| JP | A-2003-256786 | 9/2003 |
| JP | B2-3475304 | 9/2003 |

* cited by examiner

PERSONAL IDENTIFICATION METHOD, PERSONAL IDENTIFICATION SYSTEM, AND OPTICAL INFORMATION RECORDING MEDIUM

TECHNICAL FIELD

The present invention relates to an optical information recording medium on which personal identification information is recorded as a hologram, and a personal identification method and a personal identification system using the optical information recording medium.

BACKGROUND ART

In a system using a credit card, a cash card of a bank, and the like, an owner (patron) of the card is identified by identification (ID) information such as a membership number, a name, a position, and the like printed on the card. At the same time, the identity of a user is confirmed, in other words, identification operation is carried out by a PIN number or a password which an operator (user) of a card reading terminal inputs.

With the progress of information technology in recent years, on the other hand, the information technology of not only a system developer but also an antisocial organization abusing it is advanced, fraudulent transactions by card theft, forgery, and PIN number decipherment are rapidly increased.

As measures for them, the technology of encrypting information printed on the card and the like, the technology of biometric identification using biometric information such as a fingerprint and an iris pattern, and the like are developed.

The publication of Japanese Patent No. 3475304, for example, discloses an IC card which holds security information in the form of a hologram or the like in contrast to magnetically recorded ID information.

Japanese Patent Laid-Open Publication No. 2001-67399 discloses an identification system which sends biometric identification information to an IC card to carry out validation.

In the foregoing IC card disclosed in the publication of Japanese Patent No. 3475304, an image into which the security information is encoded is stuck on the IC card as the hologram. There is a problem that the security information is easily extracted from the hologram when an encoding scheme is stolen.

Also in the case of the IC card of the Japanese Patent Laid-Open Publication No. 2001-67399, there is a problem that the identification information can be extracted from the IC card when an algorithm for encoding data is recognized.

Furthermore, in an identification system by the ID card like described above, using high cryptographic technology can increase safety but, on the other hand, the amount of data processing and an infrastructure necessary for carrying out the system become large and hence convenience is reduced. Thus, a tradeoff occurs between safety and convenience.

DISCLOSURE OF THE INVENTION

The present invention aims to solve the foregoing problems. An object of the present invention is to provide an optical information recording medium, a personal identification method, and a personal identification system in which a security level is easily variable without widely changing the scale of the system and the amount of information processing as compared with the conventional technology, and from which it is very difficult to extract identification information.

The inventor has made intensive studies and found a system in which a reference beam was subjected to spatial light modulation by record cryptographic identification information based on biometric information of a user, when information was recorded by the reference beam and an object beam on an optical information recording medium such as an IC card having a holographic recording portion. At the time of reproduction, the biometric information was directly obtained from the user. Using validation cryptographic identification information obtained from the biometric information, a reproduction reference beam was subjected to spatial light modulation, and the identity of the user was verified by reproduction information of that time. According to the system, the inventor has found that the extraction of identification information was very difficult and a security level was easily variable without widely changing the scale of the system and the like.

In summary, the above-described objectives are achieved by the following embodiments of the present invention.

(1) A personal identification method for identifying a user by projecting an objective beam and a reference beam subjected to spatial light modulation in accordance with information to be recorded onto a holographic recording portion of an optical information recording medium having the holographic recording portion to record the information by interference fringes, and projecting a reproduction reference beam onto the interference fringes to reproduce the object beam, the method comprising: subjecting the reference beam to the spatial light modulation by record cryptographic identification information based on biometric information of the user when recording the information, and subjecting the reproduction reference beam to the spatial light modulation by validation cryptographic identification information based on biometric information directly obtained from the user when reproducing the information.

(2) The personal identification method according to (1), wherein imaging the biometric information by a predetermined encoding scheme forms the record cryptographic identification information and the validation cryptographic identification information, and this image is used as a modulation pattern of the reference beam and the reproduction reference beam.

(3) The personal identification method according to (2), wherein the encoding scheme comprises the steps of: dividing an original image displaying the biometric information into a plurality of pixel blocks, said pixel blocks being composed of a plurality of and the same number of pixels, and detecting the number of ON pixels or OFF pixels in each pixel block; and converting the pixels of every pixel block into conversion pixel patterns predetermined on the number of ON pixels or OFF pixels basis in accordance with the detected number in order to provide a bitmap image indicating the record cryptographic identification information and the validation cryptographic identification information.

(4) The personal identification method according to (3), wherein the pixel block is composed of an even number equal to or more than six of pixels, and the conversion pixel pattern has the same number of ON pixels and OFF pixels.

(5) The personal identification method according to any one of (1) to (4), wherein the reference beam and the reproduction reference beam are subjected to phase spatial light modulation.

(6) A personal identification system comprising: an optical information recording medium having a holographic recording portion in which a hologram is formed, the hologram being formed by interference fringes when a reference beam subjected to spatial light modulation by record cryptographic identification information based on biometric information of a user and an object beam subjected to spatial light modulation in accordance with information to be recorded are projected; a biological information sensor that can directly obtain the biometric information from the user; an information processing device for using the biometric information obtained by the biological information sensor as validation cryptographic identification information; a reproduction optical system for projecting a reproduction reference beam similar to the reference beam at the time of recording to the holographic recording portion in order to reproduce the recorded information by generated diffracted light; a spatial light modulator for modulating the reproduction reference beam by the validation cryptographic identification information; and a calculation device for verifying an identity of the user on the basis of the information reproduced by the reproduction optical system and outputting a signal allowing or refusing the user by a validation result.

(7) The personal identification system according to (6), further comprising: a hardware for allowing or refusing the user in response to the allowing or refusing signal from the calculation device.

(8) The personal identification system according to (6), or (7), wherein: a client server is provided with the biological information sensor, the information processing device, the reproduction optical system, and the spatial light modulator; a host server is provided with the calculation device; the client server and the host server are connected by a circuit; the client server outputs the reproduced personal identification information; and the host server outputs the allowing or refusing signal.

(9) The personal identification system according to any one of (6) to (8), wherein the record cryptographic information and the validation cryptographic information are modulation patterns of the biometric information by imaging the biometric information by a predetermined encoding scheme.

(10) The personal identification system according to (9), wherein the record cryptographic information and the validation cryptographic information is bitmap images formed by dividing original images displaying the biometric information into a plurality of pixel blocks composed of a plurality of and the same number of pixels, detecting the number of ON pixels or OFF pixels in each pixel block, and converting the pixels of every pixel block into conversion pixel patterns predetermined on the number of ON pixels or OFF pixels basis in accordance with the detected number.

(11) The personal identification system according to (10), wherein the pixel block is composed of an even number equal to or more than six of pixels, and the conversion pixel pattern has the same number of ON pixels and OFF pixels.

(12) The personal identification system according to any one of (6) to (11), wherein the hologram is interference fringes between the object beam and the reference beam subjected to the phase spatial light modulation.

(13) An optical information recording medium comprising: a holographic recording portion in which a hologram is formed, the hologram being formed by interference fringes when a reference beam subjected to spatial light modulation by record cryptographic identification information based on biometric information of a user and an object beam subjected to spatial light modulation in accordance with information to be recorded are projected.

(14) The optical information recording medium according to (13) wherein the record cryptographic information is modulation patterns of the biometric information by imaging the biometric information by a predetermined encoding scheme.

(15) The optical information recording medium according to (14), wherein the record cryptographic information is bitmap images formed by dividing original images displaying the biometric information into a plurality of pixel blocks composed of a plurality of and the same number of pixels, detecting the number of ON pixels or OFF pixels in each pixel block, and converting the pixels of every pixel block into conversion pixel patterns predetermined on the number of ON pixels or OFF pixels basis in accordance with the detected number.

(16) The optical information recording medium according to (15), wherein the pixel block is composed of an even number equal to or more than six of pixels, and the conversion pixel pattern has the same number of ON pixels and OFF pixels.

(17) The optical information recording medium according to any one of (13) to (16), wherein the hologram is interference fringes between the object beam and the reference beam subjected to the phase spatial light modulation.

BEST MODE FOR CARRYING OUT THE INVENTION

To achieve the foregoing object, when an object beam and a reference beam are projected onto a holographic recording portion of an optical information recording medium, the reference beam is subjected to spatial light modulation by record cryptographic identification information based on biometric information of a user. At the time of reproduction, a reproduction reference beam is subjected to spatial light modulation by validation cryptographic identification information based on biometric information directly obtained from the user, and the identity of the user is judged by diffracted light generated from a hologram. The biometric information is converted into an image by a predetermined encoding scheme in advance so as to be the record cryptographic identification information and the validation cryptographic identification information.

FIRST EMBODIMENT

Next, a personal identification system according to a first embodiment of the present invention will be explained.

Figure 1:
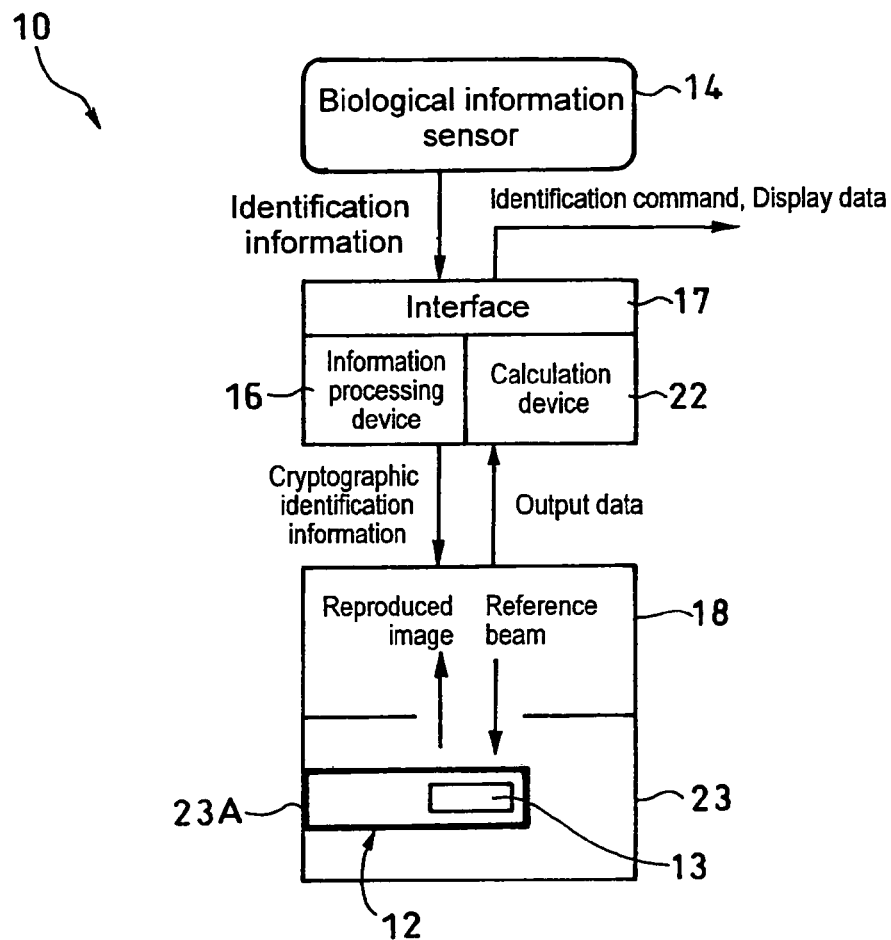
FIG. 1 is a block diagram showing a personal identification system according to a first embodiment of the present invention.

As shown in FIG. 1, a personal identification system 10 is configured to include: an optical information recording medium 12 such as, for example, an IC card having a holographic recording portion 13 on which a hologram can be formed; a biological information sensor 14 that can directly obtain biometric information such as a fingerprint, an iris pattern, a voice print, and a vein pattern from a user; an information processing device 16 for converting the biometric information obtained by the biological information sensor 14 into validation cryptographic identification information; a reproduction optical system 18 for projecting a reproduction reference beam on the holographic recording portion 13 to reproduce recorded information by generated diffracted light; a phase spatial light modulator 28 (refer to FIG. 3) for modulating the reproduction reference beam by the validation cryptographic identification information; and a calculation device 22 for verifying the identity of the user on the basis of the information reproduced by the reproduction optical system 18 (refer to FIG. 3), and outputs a signal allowing or refusing the user based on a validation result.

The reference numeral 23 of FIG. 1 denotes a loading device for attaching or detaching the card-shaped optical information recording medium 12. The reference numeral 23A of FIG. 1 denotes a card slot for inserting the optical information recording medium 12.

Figure 2:
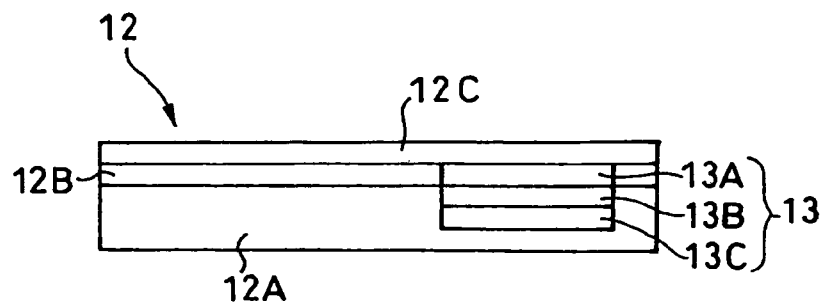
FIG. 2 is a sectional view which schematically shows an optical information recording medium used in the personal identification system.

The optical information recording medium 12, as shown in FIG. 2, has the holographic recording portion 13 embedded in a card substrate 12A. The holographic recording portion 13 is composed of a hologram protective layer 13A, a hologram information layer 13B, and an absorbing layer 13C which are stacked from the incident side of the reproduction reference beam. In FIG. 2, the reference numeral 12B denotes a printed layer, and the reference numeral 12C denotes a coating layer.

Figure 3:
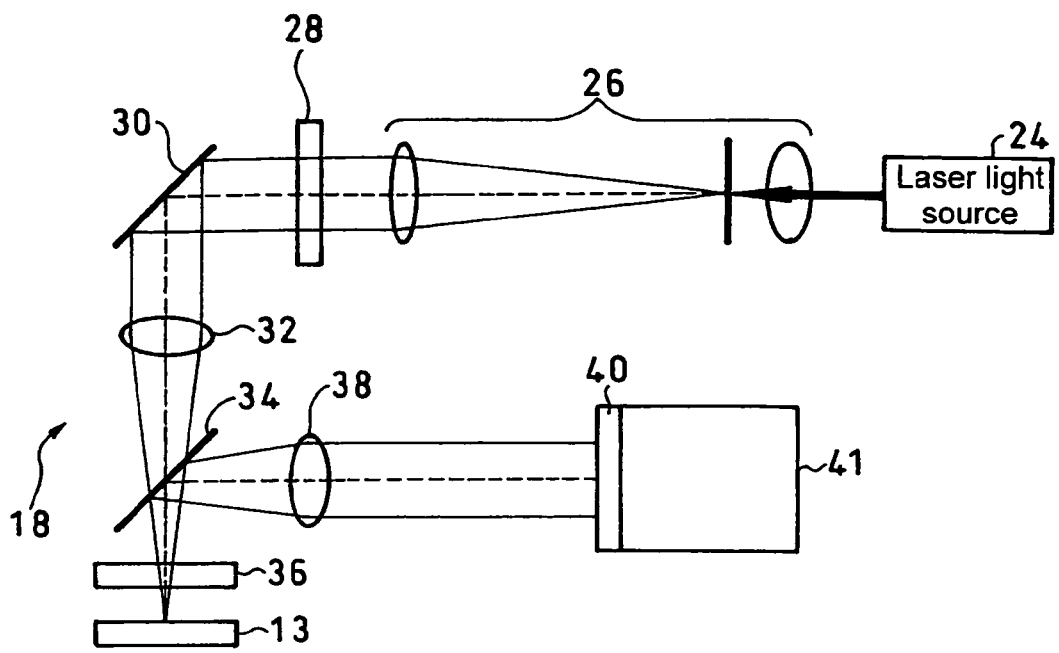
FIG. 3 is an optical system diagram which shows a reproduction optical system for reproducing and identifying a hologram on the optical information recording medium in the first embodiment.

The reproduction optical system 18 for projecting the reproduction reference beam on the holographic recording portion 13, and as shown in FIG. 3, is configured to include: a laser light source 24 which is composed of, for example, a laser diode; a beam expander 26 for expanding the beam diameter of a laser beam radiated from the laser light source 24; the phase spatial light modulator 28 for modulating the phase of the laser beam the beam diameter of which has been expanded; a mirror 30; a Fourier lens 32 which is disposed so that its focus is positioned inside or in the vicinity of the holographic recording portion 13 of the optical information recording medium 12 to perform a Fourier transform on the reproduction reference beam reflected by the mirror 30; a polarization beam splitter 34 and a quarter wave plate 36 which are disposed from the side of the Fourier lens 32 to the side of the holographic recording portion 13 in this order; an imaging lens 38 and an imaging device 40 which are disposed in a reflection optical path along which a beam incident on the polarization beam splitter 34 from the quarter wave plate 36 is reflected sideward; and a signal processing device 41 for processing a signal obtained by the imaging device 40 to reproduce an image.

Figure 4:
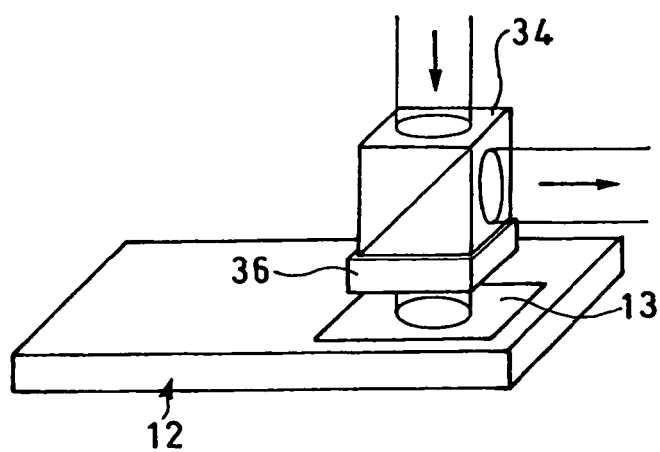
FIG. 4 is a perspective view showing a part of the reproduction optical system and the optical information recording medium.

FIG. 4 shows the polarization beam splitter 34, the quarter wave plate 36, and the optical information recording medium 12 of the reproduction optical system 18.

Then, a device and processes will be described in which a reference beam is subjected to the spatial light modulation by record cryptographic identification information based on the biometric information of a user and a hologram by interference fringes is formed on the holographic recording portion 13 of the optical information recording medium 12 by projecting the reference beam and an object beam thereonto.

Figure 5:
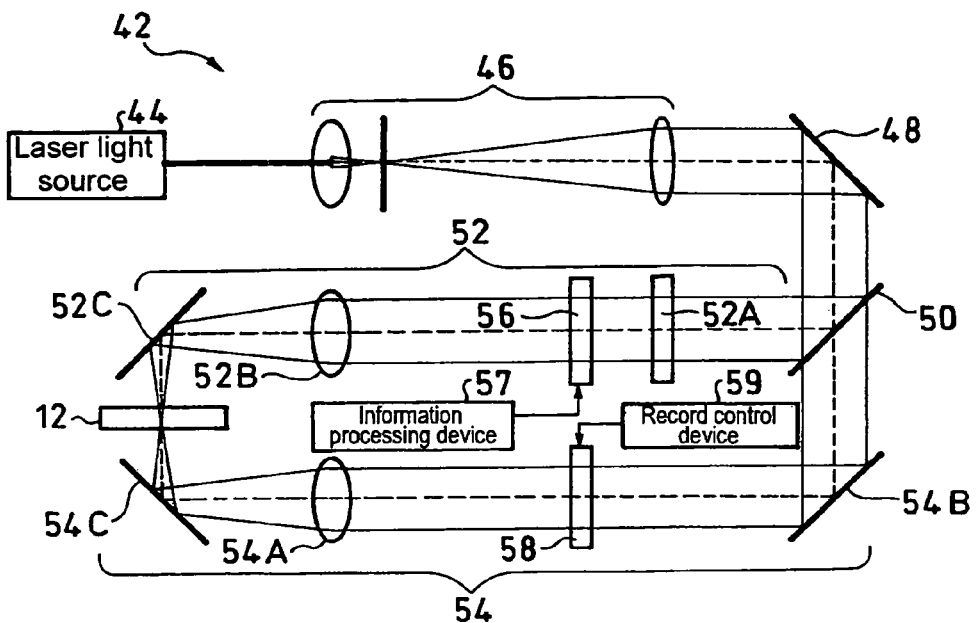
FIG. 5 is an optical system diagram which shows an optical information recording apparatus for forming a hologram on the optical information recording medium.

As shown in FIG. 5, an optical information recording apparatus 42 for forming a hologram in the holographic recording portion 13 of the optical information recording medium 12 is configured to include: a laser light source 44; a beam expander 46 for expanding the beam diameter of a laser beam radiated from the laser light source 44; a mirror 48 for reflecting the laser beam the beam diameter of which has been expanded; a polarization beam splitter 50 on which reflected light from the mirror 48 is incident; a reference optical system 52 for guiding the laser beam reflected by the polarization beam splitter 50 to the holographic recording portion 13 as a record reference beam; an objective optical system 54 for guiding the laser beam passing through the polarization beam splitter 50 to the holographic recording portion 13 as an object beam from the opposite side to the record reference beam; a phase spatial light modulator 56 for modulating the record reference beam; an amplitude spatial light modulator 58 for modulating the object beam; an information processing device 57 for inputting record cryptographic identification information based on the biometric information of the user into the phase spatial light modulator 56; and a record control device 59 for outputting a signal modulated on the basis of information such as personal information to be recorded on the holographic recording portion 13 to the amplitude spatial light modulator 58. In FIG. 5, the reference numeral 52A denotes a quarter wave plate, the reference numerals 52B and 54A denote Fourier lenses, and reference numbers 52C, 54B, and 54C denotes mirrors, respectively.

Next, a process in which the phase spatial light modulator 56 modulates the record reference beam will be described with reference to FIG. 6.

Figure 6:
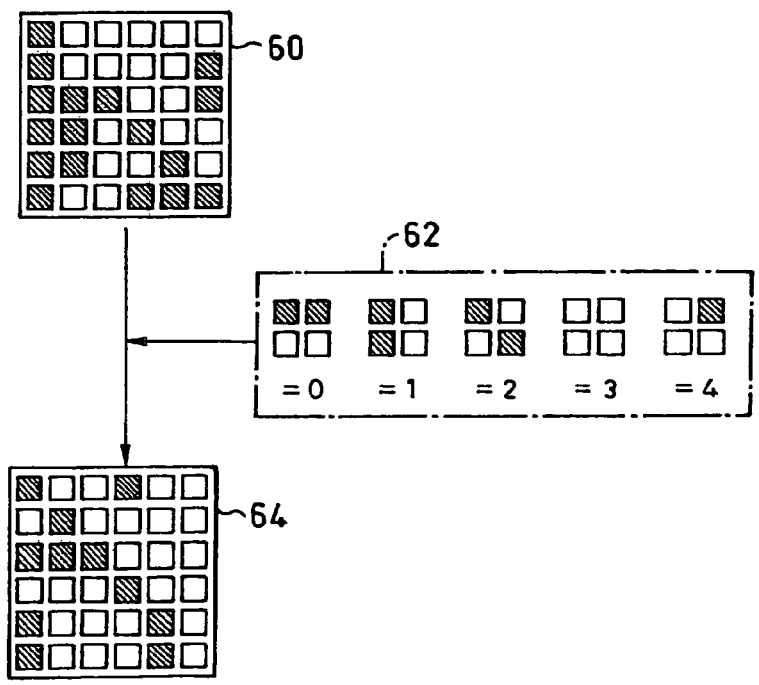
FIG. 6 is a plan view which schematically shows the process of encoding an original image obtained by the optical information recording apparatus and a spatial light modulator in the reproduction optical system to form a bitmap image.

First, the biological information sensor 14 obtains the biometric information such as a fingerprint, an iris pattern, a vein pattern, and a voice print of a proper owner (user) of the optical information recording medium 12, and an interface 17 obtains an original image 60 shown in, for example, FIG. 6.

The information processing device 57 converts the original image 60 on the basis of a conversion pixel pattern indicated by the reference numeral 62 on a pixel block, being composed of four pixels, basis in order to get a bitmap image as the record cryptographic identification information indicated by the reference numeral 64.

Conversion by the conversion pixel pattern 62 will be furthermore described in detail. The conversion pixel pattern 62 is predetermined in accordance with the number 0, 1, 2, 3, or 4 of ON pixels, colored with white in the drawing, in the pixel block composed of four pixels in the original image 60.

Accordingly, for example, a pixel block composed of four pixels on the upper left corner of the original image 60 has two ON pixels, so that the pixel block is converted into a pixel pattern indicated with "2" in the conversion pixel pattern 62.

As a result, the original image 60 is converted into the bitmap image 64. Furthermore, in response to the information processing device 57, the phase spatial light modulator 56 in the optical information recording apparatus 42 subjects the record reference beam to phase modulation by the bitmap image 64 (record cryptographic information). The record reference beam is projected onto the holographic recording portion 13 together with the object beam having information to be recorded in order to form a hologram in the form of interference fringes.

The information processing device 16 also converts an original image obtained by the biological information sensor 14 using the same conversion pixel pattern 62 as that at the time of recording in the optical information recording apparatus 42 in order to get a bitmap image as the validation cryptographic information.

Next, a process for confirming the identity of the user of the optical information recording medium 12 will be described.

First, the biological information sensor 14 directly obtains biometric information which is similar to that at the time of recording. The information processing device 16 handles this as an original image similar to the above case, and then converts the original image by the conversion pixel pattern 62 to form a bitmap image similar to the above.

Then, the information processing device 16 makes the phase spatial light modulator 28 be subject the reproduction reference beam to phase modulation on the basis of the bitmap image, so that the reproduction reference beam is made incident on the polarization beam splitter 34.

The reproduction reference beam incident on the polarization beam splitter 34 passes through the quarter wave plate 36 and is incident on the holographic recording portion 13. At the same time, diffracted light is generated in an opposite direction. The diffracted light passes through the quarter wave plate 36 and is reflected by the polarization beam splitter 34. Then, the light passes through the imaging lens 38 and is incident on the imaging device 40, so that an object beam corresponding to the object beam at the time of recording is reproduced.

The calculation device 22 judges a failure of identification if reproduction is incomplete, and identifies the user with the proper user if the reproduction is carried out. Then a signal thereof is output to the outside through the interface 17.

If a third party illegally obtains the information of the bitmap image 64, it is impossible to specify the original image 60 only based on the bitmap image 64.

In other words, the original image 60 is certainly converted into the specific bitmap image 64 by the conversion pixel pattern 62. However, even if the bitmap image 64 is given and the encoding scheme by the conversion pixel pattern 62 is revealed, it is impossible to uniquely convert the bitmap image 64 back into the original image 60. This means that image conversion at "1: plurality" holds, and the biometric information cannot be extracted from the hologram.

In reproducing the hologram, it is necessary to display an image, displayed on the phase spatial light modulator 56 at the time of recording, on the phase spatial light modulator 28 again. Only imaging the biometric information such as the finger print and the iris pattern by the predetermined encoding scheme and using this image as the modulation pattern of the reproduction reference beam, as described above, make reproduction possible.

Accordingly, the safety of data is high because normal reproduction is made impossible when any of three of the biometric information, the encoding scheme, and the hologram lacks. In the foregoing first embodiment, the phase spatial light modulators 56 and 28 are used at the time of recording and reproducing, but these may be amplitude spatial light modulators. In other words, even if the reference beam is subjected to amplitude modulation, it is difficult to reconstruct the original biometric information from only a hologram.

When using the phase spatial light modulation, it becomes impossible to reconstruct the original biometric information. This is because the phase information of light is not physical quantity observed by itself but becomes visible only the interference of coherent light, and furthermore there are an infinite number of phase modulation patterns to provide the same interference pattern.

Even in the case of subjecting the reference beam to the amplitude spatial light modulation, to make the reference beam visible, it is necessary and uneasy to know recorded information and its encoding scheme. Furthermore, when converting the biological information into the bitmap image by way of amplitude modulation, the correspondence relation of "1: plurality" as described above can make conversion irreversible in fact.

SECOND EMBODIMENT

Figure 7:
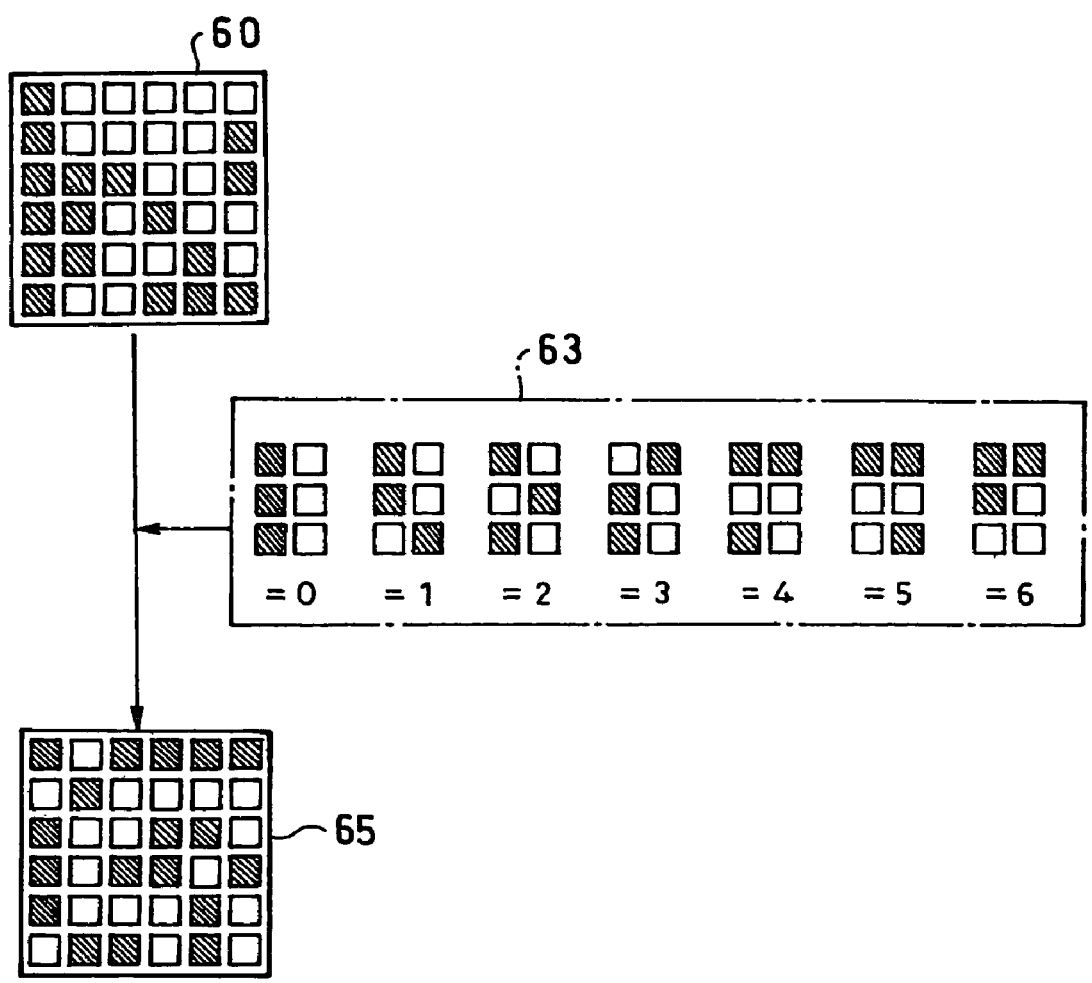
FIG. 7 is a plan view which schematically shows the process of encoding an original image to form a bitmap image according to a second embodiment.

In the foregoing first embodiment, the image block for image conversion is composed of four pixels, but the present invention is not limited to that. For example, as shown in FIG. 7, six pixels may compose one pixel block. Otherwise, an even number equal to or more than eight of pixels may compose one pixel block.

In a second embodiment, an original image 60 is encoded on the basis of a conversion pixel pattern indicated with the reference numeral 63 in accordance with the number of ON pixels in a pixel block composed of every six pixels in the original images 60 in order to form a bitmap image indicated with the reference numeral 65.

Since the number of ON pixels is set equal to the number of OFF pixels in the conversion pixel pattern 63, it is possible to satisfy uniformity in the amount of light of the record reference beam and the reproduction reference beam in holographic record and reproduction.

This is because if the number of ON pixels in the bitmap image 65, in other words, the amount of light of the whole reference beam varies, the contrast of the interference fringes by the reference beam and the signal beam (object beam) is reduced and hence proper recording is prevented. The contrast necessary for carrying out the proper recording and reproduction, in other words, the allowable amount of variations in the number of ON pixels depends on the design of the optical systems and the recording medium, required recording density, and a data transfer rate.

In the second embodiment, the conversion pixel pattern 63 is composed of three ON pixels and three OFF pixels. Thus, the converted bitmap image 65 contains the certain number of ON pixels (50% of the whole pixels) irrespective of the number of ON pixels in the original image 60.

The pixel block is composed of six pixels, but the number of pixels may be an even number equal to or more than six. The larger the size of the pixel block, the more the concealment of the biometric information (original image) is increased.

THIRD EMBODIMENT

Figure 8:
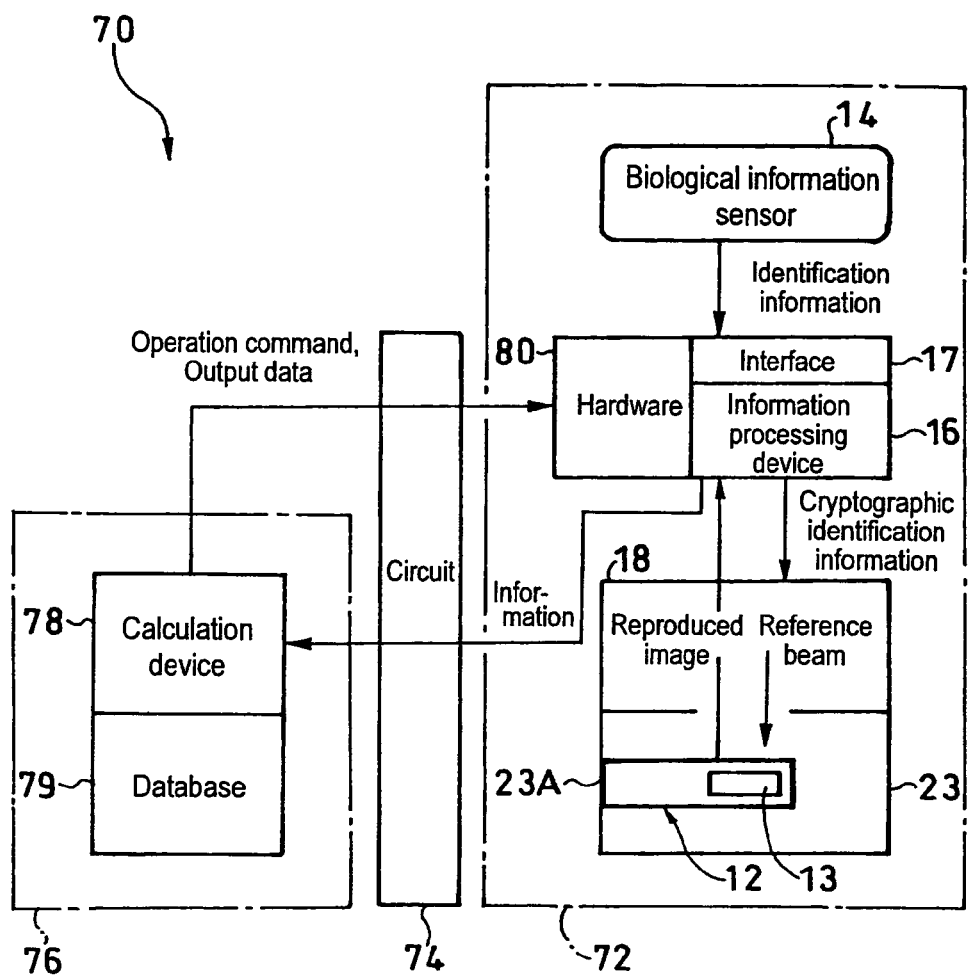
FIG. 8 is a block diagram showing a personal identification system according to a third embodiment.

Next, a third embodiment of the present invention shown in FIG. 8 will be described.

A personal identification system 70 according to the third embodiment comprises a client server 72 and a host server 76 which is connected to the client server 72 through a circuit 74. The client server 72 includes a biological information sensor 14, an information processing device 16, a reproduction optical system 18, and a spatial light modulator 20 which are identical to those of the first embodiment.

The host server 76 is provided with a calculation device 78 and a database 79 which verify the identity of a user on the basis of information reproduced by the reproduction optical system 18 and output a signal allowing or refusing the user in accordance with a validation result.

The client server 72 is provided with a hardware 80 which allows or refuses the user in response to the allowing or refusing signal from the calculation device 78. This hardware 80 is, for example, a gate for controlling entrance and exit, an automatic teller machine in a bank, or the like.

In the personal identification system 70, processes for obtaining an original image 60 from the biometric information of a user and forming a bitmap image by a conversion pixel pattern are the same as those of the foregoing first embodiment.

The basic structure of the personal identification system 70 is the same as that of the personal identification system 10 according to the first embodiment. ID information captured in the reproduction optical system 18 as a reproduction image on the side of the client server 72 is resent to the information processing device 16. Passing through signal processing such as error correction and decoding, the ID information is sent to the host server 76 through the circuit 74 as digital information, and then the calculation device 78 therein verifies the identification of the user.

The result is output from the calculation device 78 through the circuit 74. The hardware 80 works when the user is allowed, and notification is provided through an interface when the user is refused.

In general, a network circuit like the circuit 74 has the high risk of information leakage. The circuit 74, however, only communicates the ID information and operation instruction commands, as described above, so that there is no possibility of tapping of at least the identification information.

INDUSTRIAL APPLICABILITY

The personal identification method, the personal identification system, and the optical information recording medium according to the present invention are configured to subject the reference beam in recording and reproduction to the spatial light modulation on the basis of the biometric information of the user used as the cryptographic identification information, when the personal identification information is recorded and reproduced as the hologram. Therefore, it is very difficult for a third party to extract the identification information, and also it is possible to easily vary a security level without widely changing the scale of the system and the like as compared with the ordinary.

The invention claimed is:

1. A personal identification method for identifying a user by projecting an objective beam and a reference beam subjected to spatial light modulation in accordance with information to be recorded onto a holographic recording portion of an optical information recording medium having the holographic recording portion to record the information by interference fringes, and projecting a reproduction reference beam onto the interference fringes to reproduce the object beam, the method comprising:
    subjecting the reference beam to the spatial light modulation by record cryptographic identification information based on biometric information of the user when recording the information,
    subjecting the reproduction reference beam to the spatial light modulation by validation cryptographic identification information based on biometric information directly obtained from the user when reproducing the information,
    imaging the biometric information by a predetermined encoding scheme, forming the record cryptographic identification information and the validation cryptographic identification information, and this image is used as a modulation pattern of the reference beam and the reproduction reference beam, wherein
    the encoding scheme comprises the steps of:
    dividing an original image displaying the biometric information into a plurality of pixel blocks, said pixel blocks being composed of a plurality of and the same number of pixels, and detecting and counting the number of ON pixels or OFF pixels in each pixel block; and
    converting the pixels of each pixel block into a corresponding one of a plurality of predetermined conversion pixel patterns based on the counted number of ON pixels or OFF pixels in order to provide a bitmap image indicating the record cryptographic identification information and the validation cryptographic identification information; and
    wherein each pixel block is composed of an even number equal to or more than six of pixels, and each conversion pixel pattern has the same number of ON pixels and OFF pixels.

2. The personal identification method according to claim 1, wherein
    the reference beam and the reproduction reference beam are subjected to phase spatial light modulation.

3. The personal identification method according to claim 1, wherein the number of predetermined conversion pixel patterns is equal to one more than the number of pixels contained in each pixel block, each of the conversion pixel patterns being different from the other conversion pixel patterns.

4. The personal identification method according to claim 3, wherein the bitmap image is created by counting the number of ON pixels in each pixel block, determining which one of the conversion pixel patterns corresponds to the counted number of ON pixels, and substituting the pixel block of the original image with the determined conversion pixel pattern.

5. A personal identification system comprising:
    an optical information recording medium having a holographic recording portion in which a hologram is formed, the hologram being formed by interference fringes when a reference beam subjected to spatial light modulation by record cryptographic identification information based on biometric information of a user and an object beam subjected to spatial light modulation in accordance with information to be recorded are projected;
    a biological information sensor that can directly obtain the biometric information from the user;
    an information processing device for using the biometric information obtained by the biological information sensor as validation cryptographic identification information;
    a reproduction optical system for projecting a reproduction reference beam similar to the reference beam at the time of recording to the holographic recording portion in order to reproduce the recorded information by generated diffracted light;
    a spatial light modulator for modulating the reproduction reference beam by the validation cryptographic identification information; and
    a calculation device for verifying an identity of the user on the basis of the information reproduced by the reproduction optical system and outputting a signal allowing or refusing the user by a validation result, wherein
    the record cryptographic information and the validation cryptographic information are modulation patterns of the biometric information by imaging the biometric information by a predetermined encoding scheme,
    the record cryptographic information and the validation cryptographic information are bitmap images formed by dividing original images displaying the biometric information into a plurality of pixel blocks composed of a plurality of and the same number of pixels, detecting and counting the number of ON pixels or OFF pixels in each pixel block, and converting the pixels of each pixel block into a corresponding one of a plurality of predetermined conversion pixel patterns based on the counted number of ON pixels or OFF pixels, and each pixel block is composed of an even number equal to or more than six of pixels, and each conversion pixel pattern has the same number of ON pixels and OFF pixels.

6. The personal identification system according to claim 5, further comprising:

a hardware for allowing or refusing the user in response to the allowing or refusing signal from the calculation device.

7. The personal identification system according to claim 5, wherein:

a client server is provided with the biological information sensor, the information processing device, the reproduction optical system, and the spatial light modulator; a host server is provided with the calculation device; the client server and the host server are connected by a circuit; the client server outputs the reproduced personal identification information; and the host server outputs the allowing or refusing signal.

8. The personal identification system according to claim 6, wherein:

a client server is provided with the biological information sensor, the information processing device, the reproduction optical system, and the spatial light modulator; a host server is provided with the calculation device; the client server and the host server are connected by a circuit; the client server outputs the reproduced personal identification information; and the host server outputs the allowing or refusing signal.

9. The personal identification system according to claim 5, wherein the hologram is interference fringes between the object beam and the reference beam subjected to the phase spatial light modulation.

10. The personal identification system according to claim 5, wherein the hologram is interference fringes between the object beam and the reference beam subjected to the phase spatial light modulation.

11. The personal identification method according to claim 5, wherein the number of predetermined conversion pixel patterns is equal to one more than the number of pixels contained in each pixel block, each of the conversion pixel patterns being different from the other conversion pixel patterns.

12. The personal identification method according to claim 11, wherein the bitmap image is created by counting the number of ON pixels in each pixel block, determining which one of the conversion pixel patterns corresponds to the counted number of ON pixels, and substituting the pixel block of the original image with the determined conversion pixel pattern.

* * * * *